United States Patent [19]

Schrödter et al.

[11] 4,394,360
[45] Jul. 19, 1983

[54] PROCESS FOR REDUCING IRON IN PHOSPHORIC ACID SOLUTION

[75] Inventors: Klaus Schrödter; Klaus Lehr, both of Hürth, Fed. Rep. of Germany

[73] Assignee: Hoechst Aktiengesellschaft, Fed. Rep. of Germany

[21] Appl. No.: 325,811

[22] Filed: Nov. 30, 1981

[30] Foreign Application Priority Data

Dec. 4, 1980 [DE] Fed. Rep. of Germany ....... 3045645

[51] Int. Cl.³ ................. C01B 15/16; C01B 25/26
[52] U.S. Cl. ................................. 423/317; 423/8; 423/10; 423/321 R
[58] Field of Search ............... 423/321 R, 317, 8, 9, 423/10

[56] References Cited

FOREIGN PATENT DOCUMENTS 151948 12/1937 Austria .
1065388 9/1959 Fed. Rep. of Germany .
1567619 1/1974 Fed. Rep. of Germany .

OTHER PUBLICATIONS

Gmelins Handbuch der Anorganischen Chemie, vol. Phosphorus, par B, 8 Ed., p. 328.
The Condensed Chemical Dictionary, 6 Ed., p. 303.

*Primary Examiner*—O. R. Vertiz
*Assistant Examiner*—Gregory A. Heller
*Attorney, Agent, or Firm*—Connolly and Hutz

[57] ABSTRACT

Iron contained in phosphoric acid solution is reduced from the trivalent to the bivalent oxidation stage. To this end, red phosphorus is used as the reductant and the reduction is effected in the presence of copper.

9 Claims, No Drawings

PROCESS FOR REDUCING IRON IN PHOSPHORIC ACID SOLUTION

The present invention relates to a process for reducing iron from the trivalent to the bivalent oxidation stage with the use of a reducing agent, the iron being contained in phosphoric acid solutions, especially in wet-processed phosphoric acid.

Various reasons make it often necessary for phosphoric acid which is to be processed and purified to contain considerable proportions of iron-(II). As to wet-processed phosphoric acid which is normally purified by subjecting it to neutralizing treatment, it is possible for it to be quantitatively freed from vanadium contained therein only if important proportions of iron-(II)-phosphate are co-precipitated therewith. To ensure recovery of uranium from wet-processed phosphoric acid by liquid/liquid-extraction, it is also often necessary for uranium-(VI) to be reduced to uranium-(IV), by means of iron-(II)-ions.

Various processes which permit the relatively high concentration of iron-(III)-ions normally present in commercial wet-processed phosphoric acid to be reduced have already been described.

In the process described in DE-PS No. 10 68 388, for example, metallic iron or zinc is used as a reductant. This is, however, not fully satisfactory inasmuch as the metal added combines with considerable quantities of $P_2O_5$ whereby the yield of desirable $P_2O_5$ naturally becomes significantly impaired. In addition to this, hydrogen is set free during the reaction and additional steps have to be taken as a safeguard against this.

As disclosed in AT-PS No. 151 948 and DE-PS No. 15 67 619, it is also possible to use hydrogen sulfide and dithionites for reducing iron-(III)-ions. The use of $H_2S$ makes it necessary to employ expensive equipment, such as degassing columns and pressure vessels. As a result of the fact that hydrogen sulfide is extremely toxic and that $SO_2$ is set free in the event of dithionites being used, it is an imperative requirement to observe special care. In addition to this, dithionites are very hygroscopic and readily decomposable salts of which the technical uses are naturally very limited.

It is therefore an object of the present invention to provide a process which avoids the adverse effects of the reduction methods described heretofore and permits iron, which is contained in phosphoric acid solutions, especially in wet-processed phosphoric acid, to be reduced in simple fashion from oxidation stage III to stage II.

To this end, the invention unexpectedly provides a process wherein red phosphorus is used as the reductant and the reduction is carried out in the presence of copper, the latter being dissolved in the phosphoric acid solution or added thereto prior to effecting the reduction reaction.

It is sufficient for the phosphoric acid solution to contain 5 up to 100 ppm copper, which incidentally behaves in the fashion of a catalyst, although larger proportions could not be found to affect successful operation of the present process.

It is preferable for the reduction to be effected at temperatures within the range 10° to 90° C., more preferably 60° to 80° C. It is also good practice to contact the iron-containing phosphoric acid solution with red phosphorus over a period of 1 to 30 minutes, shorter contact periods, within the limits specified, being selected for an increasing temperature and/or decreasing phosphoric acid concentration, and longer contact periods, within the limits specified, being inversely selected for a decreasing temperature and/or increasing phosphoric acid concentration. Useful starting material is more particularly wet-processed phosphoric acid with the iron and copper contaminants therein. The solution which is to be reduced should preferably be passed through a fixed bed formed of ground red phosphorus particles with a preferred size within the range 0.3 to 2 mm.

In this manner, it is easily possible for the present process to be carried out continuously. To this end, the quantity of red phosphorus consumed for reduction is continuously replaced and the flow velocity of the solution through the bed of red phosphorus is selected so that solution and phosphorus remain in contact over the period at least necessary to ensure the reduction of iron.

Although it is known from "Gmelins Handbuch der anorganischen Chemie", vol. phosphorus, part B, 8th edition, page 328, that it is possible for Fe-(III) in hydrochloric acid solution to be reduced to Fe-(II) by subjecting it to boiling treatment with red phosphorus, the present process cannot reasonably been said to have been obvious to the skilled artisan, for the following reason. While iron is easy to reduce by means of red phosphorus in mineral acids other than phosphoric acid, it is indeed not reducible in the latter under standard conditions.

In the event of pure thermally-processed phosphoric acid being admixed with Fe-(III)-ions and red phosphorus, the iron is initially reduced to a minor extent only. Only in the presence of minor proportions of copper ions is the reduction accelerated catalytically. The phosphorus undergoes oxidation to phosphate and/or phosphite anions so that between 3 and 5 mols iron-(II)-ions are produced per mol P.

The present process inter alia offers the following technically beneficial effects:

(a) High reduction efficiency (reduction of an average of 4 mols Fe-(III) per mol P).

(b) High reactivity (this permits short contact times, use of relatively small-dimensioned apparatus, and operation at low temperature).

(c) Purity of reductant (the acid becomes not admixed with contaminants. Resulting oxidation products are comprised of phosphate and phosphite ions. These have no adverse effects and are oxidizable to phosphoric acid during the processing treatment).

The following Examples illustrate the invention:

Filtered, copper-containing wet-processed phosphoric acid prepared from Morocco crude phosphate with varying $P_2O_5$- and Fe-(III)-concentrations therein, and thermally processed phosphoric acid containing Fe-(III)-sulfate were continuously pumped through a heatable column. It was 30 mm wide, had a phosphorus bed volume of 200 ml and was packed with red phosphorus particles with a size of 0.3 to 0.5 mm. Depending on the throughput rates and temperature selected, the reduction efficiency was as indicated in the following Table.

The acid treated in Example 5 was additionally tested for its content of uranium-(IV). The total uranium content was 185 ppm; 170 ppm uranium-(IV) was in the treated acid, whilst only 60 ppm uranium-(IV) was in the acid prior to reduction with red phosphorus.

TABLE

| | Acid used | | | Contact period min | Temp. °C. | Acid treated % Fe (II) | Reduction efficiency in % |
|---|---|---|---|---|---|---|---|
| | % P$_2$O$_5$ | % Fe (III) | ppm Cu | | | | |
| Wet-processed phosphoric acid in Ex. Nr. | | | | | | | |
| 1 | 28 | 0.16 | 25 | 12 | 20 | 0.12 | 75 |
| 2 | 28 | 0.16 | 25 | 12 | 50 | 0.16 | 100 |
| 3 | 28 | 0.16 | 25 | 2 | 80 | 0.16 | 100 |
| 4 | 51 | 0.28 | 60 | 15 | 80 | 0.22 | 79 |
| 5 | 51 | 0.28 | 60 | 30 | 80 | 0.28 | 100 |
| Thermally processed H$_3$PO$_4$ in Ex. No. | | | | | | | |
| 6 | 28 | 0.30 | — | 20 | 80 | 0.02 | 7 |
| 7 | 28 | 0.30 | — | 80 | 80 | 0.06 | 20 |

We claim:

1. A process for reducing iron from the trivalent to bivalent oxidation stage with the aid of a reductant, the iron being present in phosphoric acid solution, which comprises using red phosphorus as the reductant and effecting the reduction in the presence of at least 5 ppm of copper, based on the weight of the solution at temperatures within the range of 10° to 90° C. by keeping the red phosphorus in contact with the iron-containing phosphoric acid solution over a period at least necessary for the reduction of iron.

2. The process as claimed in claim 1, wherein the phosphoric acid solution has copper dissolved in it.

3. The process as claimed in claim 2, wherein the solution has 5 up to 100 ppm of copper dissolved therein.

4. The process as claimed in claim 1, wherein the reduction is effected at temperatures within the range 60° to 80° C.

5. The process as claimed in claim 1, wherein wet-processed phosphoric acid containing iron and also copper is the feed material.

6. The process as claimed in claim 1, wherein the phosphoric acid solution is passed through a fixed bed of ground red phosphorus.

7. The process as claimed in claim 6, wherein the ground phosphorus has a particle size within the range 0.3 to 2 mm.

8. The process as claimed in claim 1, the process being carried out continuously by continuously replacing the red phosphorus consumed for the reduction and passing the solution through the bed of red phosphorus at a flow velocity sufficient for the solution and phosphorus to remain in contact over the period at least necessary for the reduction of iron.

9. The process as claimed in claim 1, wherein the phosphoric acid solution with the iron therein is contacted with red phosphorus over a period of 1 to 30 minutes, the contact period being selected, within the limits specified, in accordance with either the reduction temperature or the concentration of phosphoric acid or both; a shorter contact period being selected for a higher reduction temperature or a lower acid concentration or both; a longer contact period being selected for a lower reduction temperature or higher acid concentration or both.

* * * * *